(12) United States Patent
Schoenfeld et al.

(10) Patent No.: US 8,541,512 B2
(45) Date of Patent: Sep. 24, 2013

(54) EPOXY RESIN-BASED COMPOSITION MODIFIED FOR IMPACT RESISTANCE

(75) Inventors: Rainer Schoenfeld, Duesseldorf (DE); Emilie Barriau, Laguna Niguel, CA (US); Stefan Kreiling, Eppelheim (DE); Pablo Walter, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 6 days.

(21) Appl. No.: 13/361,061

(22) Filed: Jan. 30, 2012

(65) Prior Publication Data

US 2012/0128987 A1    May 24, 2012

Related U.S. Application Data

(63) Continuation of application No. PCT/EP2010/060958, filed on Jul. 28, 2010.

(30) Foreign Application Priority Data

Jul. 29, 2009   (DE) .................. 10 2009 028 100

(51) Int. Cl.
| | |
|---|---|
| C08F 283/06 | (2006.01) |
| C08G 65/32 | (2006.01) |
| C08G 59/38 | (2006.01) |
| C08G 59/00 | (2006.01) |

(52) U.S. Cl.
USPC ............ 525/404; 525/407; 523/427; 521/178

(58) Field of Classification Search
USPC ........ 428/141; 521/178; 523/427; 525/404, 525/407
See application file for complete search history.

(56) References Cited

U.S. PATENT DOCUMENTS

| | | | |
|---|---|---|---|
| 3,346,532 A | | 10/1967 | Greene et al. |
| 4,835,225 A * | | 5/1989 | Massingill et al. ........... 525/481 |
| 5,084,532 A * | | 1/1992 | Schenkel ...................... 525/524 |
| 6,015,865 A * | | 1/2000 | Blank et al. ................... 525/524 |
| 6,060,539 A * | | 5/2000 | Hermansen et al. .......... 523/400 |
| 6,462,106 B2 * | | 10/2002 | Shirakawa et al. ........... 523/404 |
| 6,723,803 B1 * | | 4/2004 | Hermansen et al. .......... 525/533 |
| 6,998,011 B2 * | | 2/2006 | Schoenfeld et al. ....... 156/331.4 |
| 7,485,680 B2 | | 2/2009 | Furukawa et al. |
| 7,736,743 B2 | | 6/2010 | Muenz et al. |
| 2005/0143496 A1 | | 6/2005 | Mueller |
| 2007/0066721 A1 | | 3/2007 | Kramer et al. |
| 2007/0105983 A1 | | 5/2007 | Kramer et al. |
| 2008/0051524 A1 * | | 2/2008 | Ji et al. .......................... 525/476 |
| 2008/0188609 A1 * | | 8/2008 | Agarwal et al. ............... 524/504 |
| 2010/0127204 A1 * | | 5/2010 | Birnbrich et al. ............... 252/62 |
| 2012/0010310 A1 * | | 1/2012 | Birnbrich et al. ............... 521/99 |

FOREIGN PATENT DOCUMENTS

| | | |
|---|---|---|
| EP | 0276716 A2 | 8/1988 |
| EP | 0754741 A2 | 1/1997 |
| EP | 0754742 A2 | 1/1997 |
| GB | 2001324 A | 1/1979 |
| WO | 8304415 A1 | 12/1983 |
| WO | 2007004184 A1 | 1/2007 |
| WO | 2007025007 A1 | 3/2007 |
| WO | 2008027119 A1 | 3/2008 |

OTHER PUBLICATIONS

Xu, L. Roy, et al. "Structural Nanocomposite Bonding Reinforced by Graphite Nanofibers with Surface Treatments", Materials Research Society Symposium Proceedings, vol. 843, 2005, pp. 81-88.
"ASTM Designation: D 5045-99, Standard Test Methods for Plan-Strain Fracture Toughness and Strain Energy Release Rate of Plastic Materials", ASTM International, 2007, pp. 1-9.
"ASTM Designation: D 683-42T, Tentative Methods of Test for Identification of Finishes on Textiles", ASTM International, 1942, pp. 124-126.
"ASTM Designation D790-10, Standard Test Methods for Flexural Properties of Unreinforced and Reinforced Plastics and Electrical Insulating Materials", ASTM International, retreived on Jul. 12, 2011, pp. 1-11.
"DIN EN 1465" DIN Deutsches Institut für Normung e.V., Jul. 2009, pp. 1-9.

* cited by examiner

*Primary Examiner* — Mark Eashoo
*Assistant Examiner* — Megan McCulley
(74) *Attorney, Agent, or Firm* — Sun Hee Lehmann

(57) ABSTRACT

A resin component for a one- or two-component adhesive, a matrix resin, or a structural foam, comprising: C1) at least one epoxy resin, having an average of more than one epoxy group per molecule, that does not correspond to the definition of component C2); C2) at least one oligomeric or polymeric urethane-group-free polyether compound. A one- or two-component epoxy adhesive, structural foam, or matrix material for composites, comprising the aforesaid resin components.

22 Claims, No Drawings

EPOXY RESIN-BASED COMPOSITION MODIFIED FOR IMPACT RESISTANCE

CROSS-REFERENCE TO RELATED APPLICATIONS

This application is a continuation of International Patent Application No. PCT/EP2010/060958 filed Jul. 28, 2010, which claims priority to German Patent Application No. 10 2009 028 100.2 filed Jul. 29, 2009, the contents of both of which are incorporated herein by reference.

The present invention relates to an epoxy resin system that has a high E-modulus, a high level of toughness, and high elongation at fracture. It can be used in an adhesive, in a matrix of a composite or, with addition of a foaming agent (=blowing agent), in a structural foam. The improvements in the aforesaid properties are achieved on the basis of addition of an economically manufacturable urethane-group-free polyether compound.

Epoxy-based resin systems have been successfully used for some time in the aviation, automotive, or electrical industry as adhesives, sealants, or for the coating of surfaces, or as resin systems with a number of different materials for the manufacture of composite materials. Hardenable formulations that comprise epoxy/hardener mixtures are suitable in particular as structural adhesives and as matrix resins for composite materials. Important material properties of the hardened formulations are, among others, fracture toughness, crack toughness, notch impact toughness, impact peel strength, E-modulus, elongation at fracture, tensile strength, and glass transition temperature. A high elongation at fracture along with a high E-modulus, a high critical stress intensity factor under tensile loading (=K1C), and low material costs are particularly desirable for structural adhesives and for matrix resins for composite materials.

WO 2007/004184 describes a thermally foamable material that comprises the following components: a) a solid epoxy resin that is substantially free of liquid or semi-solid epoxy resin, b) an impact improver, c) a hardener, and d) a heat-activatable blowing agent. The impact improver in this context can represent a thermoplastic material. The following are recited, for example: epoxy-polyurethane hybrids and isocyanate prepolymers (for example, isocyanate-terminated polyether polyols) that have a molar mass in the range between 1000 and 10,000 g/mol.

WO 2007/025007 discloses a composition having the following components: a) at least one epoxy resin, b) rubber particles having a core-shell structure, c) a further impact modifier resp. toughness improver, and d) a heat-activatable latent hardener. Recited as components c) are, for example, polyurethanes that derive from hydroxyl-terminated polyoxyalkylenes such as, for example, polypropylene glycol or polytetrahydrofurandiol. These are said to exhibit thermoplastic behavior. Also recited as component c) are reaction products of amine-terminated polyethers with epoxy resins, such that the amine-terminated polyethers can be di- or trifunctional. The amine-terminated polyethers preferably comprise at least two amino groups per molecule.

DE-A-2829236 discloses linear polyether resins comprising glycidyl groups and hydroxyl groups and the use thereof, together with aminoplast or phenolplast hardening agents, in hardenable mixtures. The polyether resins are manufactured by reacting diglycidyl ethers of polyethylene glycols and polypropylene glycols with divalent phenols.

EP-B-1648950 describes epoxy-resin-based heat-hardenable compositions that, in order to improve low-temperature impact toughness, comprise urethane-group-containing polymers that can be obtained by reacting a monohydroxyepoxy compound with isocyanate-terminated polyurethane prepolymers. A similar principle is disclosed in EP-B-1578838.

WO 83/04415 discloses epoxy resins which comprise polyether chains that are obtained by reacting diepoxides with compounds that comprise two aromatic hydroxyl groups per molecule. Coating materials can be obtained therefrom by a reaction with hardeners for epoxy resins, such as aminoplast resins, other amino-group-containing resins, or diisocyanates. Considerable quantities of organic solvents are included in order to establish the viscosity necessary for coating agents. Coating materials do not meet the requirements applied to structural adhesives, structural foams, or matrix materials for composites.

U.S. Pat. No. 3,346,532 describes elastic copolymers made of divalent phenols and organic diepoxides, which serve as starting products for the manufacture of rubber-like products. These do not meet the requirements applied to structural adhesives, structural foams, or matrix materials for composites.

The present invention makes available an epoxy resin system that has a high E-modulus, a high level of toughness, and high elongation at fracture. It can be used in an adhesive, in a matrix of a composite or, upon addition of a foaming agent, in a structural foam. The improvement in the aforesaid properties is achieved as a result of the addition of an economically manufacturable urethane-group-free polyether compound.

In a first aspect, the present invention relates to A resin component for a one- or two-component adhesive or a structural foam, comprising C1) at least one epoxy resin, having an average of more than one epoxy group per molecule, that does not correspond to the definition of component C2);

C2) at least one oligomeric or polymeric urethane-group-free polyether compound encompassing one or more structural elements of the general formula (I)

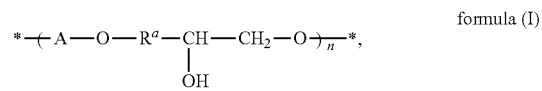

formula (I)

where n is a number from 5 to 10,000; each residue $R^a$ in each repeating unit denotes, mutually independently, a divalent connecting group that encompasses 1 to 100 carbon atoms; and each residue A in each repeating unit is selected, mutually independently, from K or L, K denoting a divalent residue of aromatic dihydroxy compounds after the removal of the two hydroxy groups, and L denoting a divalent residue of polyethers after the removal of two terminal hydroxy groups, with the provision that, based on the total number of all residues A in the oligomeric or polymeric urethane-group-free polyether compound, 20 to 80% of all residues A denote K, and 20 to 80% of all residues A denote L.

An "epoxy resin" is understood in the context of the present invention as a resin composition that is formed on the basis of epoxy compounds or epoxy-containing compounds. For purposes of the present invention, all oligomeric or polymeric polyurethane-group-free polymer compounds of component C2) are explicitly excluded from the designation "epoxy resin" even if they comprise terminal oxirane groups.

In a preferred embodiment of the invention, the epoxy compounds or epoxy-containing compounds of the epoxy resin system of the polymerizable preparation can encompass both oligomeric and monomeric epoxy compounds as well as epoxies of the polymeric type, and can in principle represent aliphatic, cycloaliphatic, aromatic, or heterocyclic compounds. Suitable epoxy resins in the context of the present invention are, for example, preferably selected from epoxy resins of the bisphenol A type, epoxy resins of the bisphenol S type, epoxy resins of the bisphenol F type, epoxy resins of the phenol novolac type, epoxy resins of the cresol novolac type, epoxidized products of numerous dicyclopentadiene-modified phenol resins obtainable by the reaction of dicyclopentadiene with numerous phenols, epoxidized products of 2,2',6,6'-tetramethylbiphenol, aromatic epoxy resins such as epoxy resins having a naphthalene backbone and epoxy resins having a fluorene backbone, aliphatic epoxy resins, alicyclic epoxy resins such as 3,4-epoxycyclohexylmethyl-3,4-epoxycyclohexane carboxylate and bis(3,4-epoxycyclohexyl)adipate, and epoxy resins having a hetero ring, such as triglycidyl isocyanurate. The epoxy resins encompass, in particular, octadecylene oxide, styrene oxide, vinylcyclohexene oxide, glycidol, vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, dipentene dioxide, epoxidized polybutadiene (e.g. Krasol products of Sartomer), silicone resin comprising epoxide functionality, flame-retardant epoxy resins (e.g. "DER-580"), bis(3,4-epoxycyclohexyl)adipate, 2-(3,4-epoxycyclohexyl-5,5-spiro-3,4-epoxy)cyclohexanemetadioxane, vinylcyclohexene monoxide, and 2-epoxyhexadecane.

Particularly preferred epoxy resins for purposes of the present invention are cycloaliphatic epoxy resins that are obtainable commercially, for example, under the trade name CY179 (Huntsman), ACHWL CER 4221 (Achiewell, LLC), or Cyracure 6105/6110 (Dow Chemical).

The epoxy resins furthermore encompass, for example, the reaction product of bisphenol A and epichlorohydrin, the reaction product of phenol and formaldehyde (novolac resins) and epichlorohydrin, glycidyl esters, and the reaction product of epichlorohydrin and p-aminophenol.

Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane, and 1,5-hydroxynaphthalene.

Further suitable epoxy prepolymers are polyglycidyl ethers of polyalcohols or diamines. Polyglycidyl ethers of this kind are derived from polyalcohols such as, for example, ethylene glycol, diethylene glycol, triethylene glycol, 1,2-propylene glycol, 1,4-butylene glycol, triethylene glycol, 1,5-pentanediol, 1,6-hexanediol, or trimethylolpropane.

Further preferred epoxy resins that are commercially obtainable encompass, in particular, octadecylene oxide, epichlorohydrin, styrene oxide, vinylcyclohexene oxide, glycidol, glycidyl methacrylate, diglycidyl ethers of bisphenol A (e.g. those that are obtainable under the commercial designations "Epon 828", "Epon 825", "Epon 1004" and "Epon 1010" of Hexion Specialty Chemicals Inc., "DER-331", "DER-332", "DER-334", "DER-732" and "DER-736" of Dow Chemical Co.), vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, aliphatic epoxide modified with polypropylene glycol, dipentene dioxide, epoxidized polybutadiene (e.g. Krasol products of Sartomer), silicone resins comprising epoxide functionality, flame-retardant epoxy resins (e.g. "DER-580", a brominated epoxy resin of the bisphenol type that is obtainable from Dow Chemical Co.), 1,4-butanediol diglycidyl ethers of a phenol/formaldehyde novolac (e.g. "DEN-431" and "DEN-438" of the Dow Chemical Co.), as well as resorcinol diglycidyl ethers (e.g. "Kopoxite" of the Koppers Company Inc.), bis(3,4-epoxycyclohexyl)adipate, 2-(3,4-epoxycyclohexyl-5,5-spiro-3,4-epoxy)cyclohexanemetadioxane, vinylcyclohexene monoxide, 1,2-epoxyhexadecane, alkyl glycidyl ethers such as, for example, C8 to C10 alkyl glycidyl ethers (e.g. "HELOXY Modifier 7" of Hexion Specialty Chemicals Inc.), C12 to C14 alkyl glycidyl ethers (e.g. "HELOXY Modifier 8" of Hexion Specialty Chemicals Inc.), butyl glycidyl ethers (e.g. "HELOXY Modifier 61" of Hexion Specialty Chemicals Inc.), cresyl glycidyl ethers (e.g. "HELOXY Modifier 62" of Hexion Specialty Chemicals Inc.), p-tert-butylphenyl glycidyl ethers (e.g. "HELOXY Modifier 65" of Hexion Specialty Chemicals Inc.), polyfunctional glycidyl ethers such as, for example, diglycidyl ethers of 1,4-butanediol (e.g. "HELOXY Modifier 67" of Hexion Specialty Chemicals Inc.), diglycidyl ethers of neopentyl glycol (e.g. "HELOXY Modifier 68" of Hexion Specialty Chemicals Inc.), diglycidyl ethers of cyclohexanedimethanol (e.g. "HELOXY Modifier 107" of Hexion Specialty Chemicals Inc.), trimethylolethane triglycidyl ethers (e.g. "HELOXY Modifier 44" of Hexion Specialty Chemicals Inc.), trimethylolpropane triglycidyl ethers (e.g. "HELOXY Modifier 48" of Hexion Specialty Chemicals Inc.), polyglycidyl ethers of an aliphatic polyol (e.g. "HELOXY Modifier 84" of Hexion Specialty Chemicals Inc.), polyglycol diepoxide (e.g. "HELOXY Modifier 32" of Hexion Specialty Chemicals Inc.), bisphenol F epoxies (e.g. "EPN-1138" or "GY-281" of Huntsman Int. LLC), 9,9-bis-4-(2,3-epoxypropoxy)phenylfluorenone (e.g. "Epon 1079" of Hexion Specialty Chemicals Inc.).

Further preferred commercially obtainable compounds are selected, for example, from Araldite™ 6010, Araldit™ GY-281™, Araldit™ ECN-1273, Araldit™ ECN-1280, Araldit™ MY-720, RD-2 of Huntsman Int. LLC; DENT™ 432, DEN™ 438, DEN™ 485 of Dow Chemical Co., Epon™ 812, 826, 830, 834, 836, 871, 872, 1001, 1031 etc. of Hexion Specialty Chemicals Inc. and HPT™ 1071, HPT™ 1079 likewise of Hexion Specialty Chemicals Inc., as novolac resins furthermore, for example, Epi-Rez™ 5132 of Hexion Specialty Chemicals Inc., ESCN-001 of Sumitomo Chemical, Quatrex 5010 of Dow Chemical Co., RE 305S of Nippon Kayaku, Epiclon™ N673 of DaiNipon Ink Chemistry, or Epicote™ 152 of Hexion Specialty Chemicals Inc.

In a preferred embodiment, the polymerizable preparation according to the present invention encompasses a mixture of several of the aforementioned epoxy resins.

The proportion of the epoxy resin or the mixture of several epoxy resins in terms of the total quantity of the polymerizable preparation is preferably 2 to 98 wt %, particularly preferably 10 to 90 wt %, and greatly preferably 30 to 85 wt %.

Effective impact modification of the hardened product is achieved by the use of the oligomeric or polymeric urethane-group-free polyether compounds C2) in the polymerizable composition.

A "polyether compound" is understood for purposes of the present invention to mean compounds that comprise four or more than four ether linkages. Oligomeric polyether compounds comprise 4 to 20 ether linkages, while polymeric polyether compounds encompass more than 20 ether linkages.

The term "urethane-group-free polyether compound" is understood, for purposes of the present invention, to mean oligomeric or polymeric polyether compounds whose polymer chains are substantially free of urethane groups (—NH—CO—O). "Substantially free" means that the proportion of urethane groups in terms of the molecular weight of a molecule of the oligomeric or polymeric polyether compound is equal to less than 0.5%, by preference less than 0.25%, and particularly preferably less than 0.1%. In a preferred embodiment of the invention, the oligomeric or polymeric polyether compound is entirely free of urethane groups, so that the proportion of urethane groups in terms of the molecular weight of each molecule of the oligomeric or polymeric polyether compound is equal to 0%.

Urethane groups in a polymer chain are, as a rule, formed by the reaction of an alcohol with an isocyanate. Thanks to the use according to the present invention of the urethane-group-free polyether compounds as an impact modifying agent, it is possible substantially to dispense with the use of isocyanate-containing compounds in the manufacture thereof. In addition, the polymerizable compositions according to the present invention that comprise urethane-group-free polyether compounds as toughness promoters exhibit a greatly reduced viscosity with respect to comparable compositions having urethane-group-containing polyether compounds.

The viscosity of the polymerizable compositions according to the present invention thus remains low even when larger quantities of urethane-group-free polyether compounds are used as an impact modifying agent.

Component C2) can be manufactured, for example, by reacting at least one component X with at least one component Y, component X being selected from the group made up of:
(X-1) aromatic compounds having at least two aromatic hydroxy groups, and
(X-2) polyethers having at least two terminal hydroxy groups, and component Y being selected from the group made up of
(Y-1) polyethers having at least two terminal oxirane groups, and
(Y-2) aromatic compounds of the general formula (II)

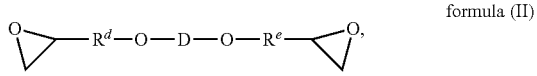

formula (II)

where each residue $R^d$ and $R^e$ denotes, mutually independently in each case, a divalent connecting group that encompasses 1 to 100 carbon atoms, and residue D encompasses at least one aromatic group, with the provision that the reaction solely between one or more component(s) that meet the definition of (X-1) and one or more components(s) that meet the definition of (Y-2), and the reaction solely between one or more components that meet the definition of (X-2) and one or more components that meet the definition of (Y-1), is excluded.

In a preferred embodiment, the oligomeric or polymeric urethane-group-free polyether compound of the present invention comprises at least one terminal hydroxy group and/or at least one terminal oxirane group. In particular, all terminal groups of the oligomeric or polymeric urethane-group-free polyether compound of the present invention are selected from hydroxy groups and/or oxirane groups.

Preferred oligomeric or polymeric urethane-group-free polyether compounds have a weight-average molecular weight from 1000 to 100,000 g/mol, by preference from 2000 to 8000 g/mol, and particularly preferably from 3000 to 5000 g/mol.

Oligomeric or polymeric urethane-group-free polymeric compounds having a weight-average molecular weight lower than 1000 g/mol can act in the resin matrix as plasticizers, thus yielding polymerization products that, because of their fracture-mechanical properties and their comparatively low flexural modulus, are unsuitable for most applications, in particularly in composite materials.

Oligomeric or polymeric urethane-group-free polyether compounds having a weight-average molecular weight higher than 100,000 g/mol generally exhibit very high viscosity. It is therefore possible for the aforementioned polyether compounds to exhibit comparatively poor compatibility with the resin matrix.

The oligomeric or polymeric urethane-group-free polyether compound C2) of the present invention encompasses one or more structural elements of the general formula (I), as described above. The divalent residue K is obtained formally by the removal of two hydroxy groups from aromatic dihydroxy compounds. "Aromatic dihydroxy compounds" are understood for purposes of the present invention as all compounds that encompass two hydroxy groups, each hydroxy group being covalently bonded to a carbon atom of an aromatic resp. heteroaromatic ring system. The two hydroxy groups can be connected both to the same and to two different aromatic resp. heteroaromatic ring systems.

The divalent residue L is obtained formally by the removal of two terminal hydroxy groups from polyethers. Residue L thus encompasses all divalent groups that have the chemical structure described above. It is evident that the chemical structure of residue L can also be achieved formally in many other ways, for example by the removal of two terminal groups from amino-terminal polyethers. Such residues also, of course, come under the definition of residue L arrived at above.

The divalent residue L is preferably obtained formally by the removal of two terminal hydroxy groups from "non-aromatic polyethers," the term "non-aromatic polyether" being understood for purposes of the present invention to mean polyethers that do not encompass an aromatic structural element.

In a further preferred embodiment of the invention, the divalent residue L is obtained formally by the removal of two terminal hydroxy groups from polyalkylene oxides, non-aromatic polyalkylene oxides, being particularly preferred.

The oligomeric or polymeric urethane-group-free polyether compounds that encompass, as residue L, structural elements derived from non-aromatic polyethers and/or polyalkylene oxides exhibit particularly good effectiveness as impact modifying agents.

For the case in which the oligomeric or polymeric urethane-group-free polyether compound encompasses multiple structural elements of the general formula (I), said structural elements can be identical or different and can be connected to one another by way of one or more arbitrary connecting groups. The respective connecting groups are, in this context, identical or different and are by preference selected from covalent bonds and linear or branched di-, tri-, tetra-, penta-, or polyvalent groups that each encompass 1 to 100 carbon atoms. The aforesaid connecting groups are preferably selected from C1 to 22 alkyls, in particular C6 to 22 alkyls, C2 to 22 alkenyls, in particular C6 to 22 alkenyls, C2 to 22 alkinyls, in particular C6 to 22 alkinyls, C5 to 8 cycloalkyls, C3 to 22 heteroalkyls, C4 to 22 heterocycloalkyls, C6 to 14 aryls, and C6 to 14 heteroaryls.

All the aforesaid connecting groups can, independently of one another in each case, be mono- or polysubstituted, in particular mono-, di, or trisubstituted, preferably monosubstituted, in particular with substituents selected from halogen, in particular chlorine, bromine, or fluorine, trifluormethyl, C1 to 18 alkyl, C3 to 8 cycloalkyl, C2 to 18 alkenyl, C2 to 18 alkinyl, heteroalkyl, heterocycloalkyl, C1 to 18 alkoxy, C1 to 18 alkylsulfanyl, C1 to 18 alkylsulfonyl, C1 to 18 alkylsulfoxidyl, C1 to 18 alkanoyl, C1 to 18 alkanoyloxy, C1 to 18 alkoxycarbonyl, C1 to 18 alkylaminocarbonyl, C1 to 18 alkylsulfanylcarbonyl, sulfanyl, cyan, amino, heteroaryl, heteroaryl-C1 to 12 alkyl, heteroaryloxy, heteroarylamino, heteroarylsulfanyl, heteroarylsulfonyl, heteroarylsulfoxidyl, heteroarylcarbonyl, heteroarylcarbonyloxy, heteroaryloxycarbonyl, heteroarylaminocarbonyl, heteroarylsulfanylcarbonyl, C1 to 18 alkoxysulfonyl, C1 to 18 alkoxycarbinol, sulfo, sulfino, sulfeno, formyl, thiofomryl, preferably with halogen, C1 to 18 alkyl, C2 to 18 alkenyl, C2 to 18 alkinyl, and C1 to 18 alkoxy.

In a preferred embodiment, the proportion of residue K in terms of the total number of all residues A in the oligomeric or polymeric urethane-group-free polyether compound is equal to 30 to 70%, by preference 40 to 60%, and in particular 45 to 55%. Oligomeric or polymeric urethane-group-free polyether compounds having the aforesaid proportions of residues K exhibit particularly good compatibility with the epoxy resin matrix.

In a preferred embodiment, the proportion of residue L in terms of the total number of all residues A in the oligomeric or polymeric urethane-group-free polyether compound is equal to 30 to 70%, by preference 40 to 60%, and in particular 45 to 55%. Oligomeric or polymeric urethane-group-free polyether compounds having the aforesaid proportions of residues L have a comparatively low glass transition temperature Tg and a reduced viscosity, thereby yielding polymerizable compositions that have particularly good processability.

The compatibility, viscosity, and glass transition temperature of the oligomeric or polymeric urethane-group-free polyether compound can be precisely adjusted by appropriate selection of the percentage proportions of residues K and L.

The impact toughness, flexural properties, and microstructure formed after curing of the polymerization products according to the present invention can furthermore be specifically controlled, depending on the epoxy resin or mixture of different epoxy resins that is used, by way of the percentage ratios of residues K and L in the oligomeric or polymeric urethane-group-free polyether compound.

Those oligomeric or polymeric urethane-group-free polyether compounds in which the proportion of all structural elements of formula (I) in terms of the weight-average molecular weight of the oligomeric or polymeric urethane-group-free polyether compound is equal to 40 to 99.99%, by preference 70 to 99%, and in particular 85 to 98%, are particularly preferred in the context of the invention.

Oligomeric or polymeric urethane-group-free polyether compounds having the aforementioned proportions of structural elements of formula (I) permit particularly effective impact modification of the cured polymerizable compositions according to the present invention.

The individual structural elements of the general formula (I) can, in this context, be arranged and/or linked so that they form a linear oligomeric or polymeric urethane-group-free polyether compound of the present invention, and/or are a constituent of such a compound.

As an alternative to this, the individual structural elements of the general formula (I) can, in this context, be arranged and/or linked so that they form a branched oligomeric or polymeric urethane-group-free polyether compound of the present invention, and/or are a constituent of such a compound.

Preferred oligomeric or polymeric urethane-group-free polyether compounds are selected, in the context of the present invention, from compounds of the general formula (III),

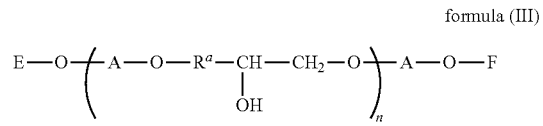

formula (III)

where E is selected from hydrogen or from residues of the general formula (IV)

formula (IV)

F is selected from hydrogen or from residues of the general formula (V)

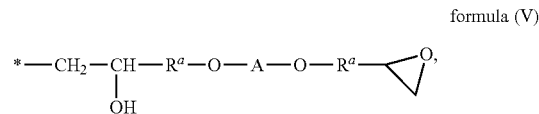

formula (V)

n in formula (III) is a number from 5 to 10,000, each residue $R^a$ in each repeating unit and in formulas (III), (IV), and (V), mutually independently, denotes a divalent connecting group that encompasses 1 to 100 carbon atoms, and each residue A in each repeating unit and in formula (V) is selected, mutually independently, from K or L, K denoting a divalent residue of aromatic dihydroxy compounds after removal of the two hydroxy groups, and L a divalent residue of polyethers after the removal of two terminal hydroxy groups, in which, based on the total number of all residues A in the oligomeric or polymeric urethane-group-free polyether compound, 20 to 80% of all residues A denote K, and 20 to 80% of all residues A denote L.

The properties of the urethane-group-free polyether compound can be modified by way of the number of repeating units, thereby making it possible to adapt the aforesaid polyethers in controlled fashion to a specific epoxy matrix. In formulas (I) and (III), n therefore denotes by preference a number from 3 to 20, particularly preferably a number from 5 to 15, and greatly preferably a number from 7 to 10.

In preferred embodiments of the present invention, each residue $R^a$ in formulas (I), (III), (IV), and/or (V) is selected, mutually independently, from alkylene groups that encompass 1 to 10 carbon atoms. $R^a$ is selected in particular from linear alkylene groups that encompass 1 to 6, in particular 1 or 2 carbon atoms, for example methylene and ethylene groups, $R^a$ particularly preferably denoting, in the aforesaid formulas, a methylene group.

The urethane-group-free polyether compounds of the present invention according to formulas (I), (III), and/or (V) can be manufactured in particular from aromatic substances having at least two aromatic hydroxy groups and/or polyethers having at least two terminal hydroxy groups. Use of the aforesaid substances is advantageous because they can be manufactured economically or are available commercially with a wide variety of structures.

It is particularly advantageous if substances having terminal oxirane groups are used in the manufacture of the urethane-group-free polyether compounds of the present invention. Use of the aforesaid substances is advantageous because they can be manufactured economically and are available commercially with a wide variety of structures.

The divalent residue K is obtained formally by the removal of two hydroxy groups from aromatic dihydroxy compounds. Preferred residues K are selected, in each repeating unit and in each of formulas (I), (III), and optionally (V), mutually independently, from divalent residues of the general formula (VI) and/or formula (VII)

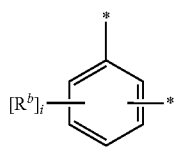

formula (VI)

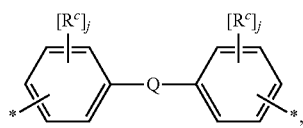

formula (VII)

Q being selected from alkylene, oxygen, sulfur, sulfoxide, sulfone, and a direct covalent bond, and i and j denoting, mutually independently, a number from 0 to 4, in particular 0 or 1.

If present, the residues $R^b$ and $R^c$, which each replace a hydrogen atom of the aromatic ring system, are selected mutually independently from halogen, in particular fluorine, chlorine, bromine, or iodine, C1 to 40 alkyl, for example methyl, ethyl, isopropyl, C2 to 40 alkenyl, C1 to 40 alkoxyl, and C7 to 13 aralkyl. Residue $R^b$ in formula (V) can also be a divalent residue that turns the phenyl group into a corresponding naphthyl group. In specific embodiments of the present invention, residues $R^b$ and $R^c$, if present, can encompass at least one further structural element of the general formula (I).

An "alkylene group Q" is understood in the context of the present invention to mean divalent alkyl residues, i.e. alkyls that can still participate in a bond at both ends. Preferred alkylene residues are, for example, substituted or unsubstituted, saturated or unsaturated alkylene residues having 1 to 40 carbon atoms. Preferred compounds are selected from, for example, —CH₂— (methylene), —CH₂—CH₂— (ethylene), —CH₂—CH₂—CH₂— (propylene), —CH₂—CH₂—CH₂— CH₂— (butylene), —CH₂—CH₂—CH₂—CH₂—CH₂— (hexylene), —CH₂—CH₂—CH₂—CH₂—CH₂—CH₂— (heptylene), —CH₂—CH₂—CH₂—CH₂—CH₂—CH₂— CH₂—CH₂— (octylene), but also the branched derivatives thereof such as isopropylene, tert-butylene.

The alkylene group Q can be present in mono- or polysubstituted form. Suitable substituents can be selected, for example, from halogen, in particular chlorine, bromine, or fluorine, trifluoromethyl, C1 to 18 alkyl, C3 to 8 cycloalkyl, C2 to 18 alkenyl, C2 to 18 alkinyl, heteroalkyl, heterocycloalkyl, C1 to 18 alkoxy, C1 to 18 alkylsulfanyl, C1 to 18 alkylsulfonyl, C1 to 18 alkylsulfoxidyl, C1 to 18 alkanoyl, C1 to 18 alkanoyloxy, C1 to 18 alkoxycarbonyl, C1 to 18 alkylaminocarbonyl, C1 to 18 alkylsulfanylcarbonyl, sulfanyl, cyan, heteroaryl, heteroaryl-C1 to 12 alkyl, heteroaryloxy, heteroarylamino, heteroarylsulfanyl, heteroarylsulfonyl, heteroarylsulfoxidyl, heteroarylcarbonyl, heteroarylcarbonyloxy, heteroaryloxycarbonyl, heteroarylaminocarbonyl, heteroarylsulfanylcarbonyl, C1 to 18 alkoxysulfonyl, C1 to 18 alkoxycarbinol, sulfo, sulfino, sulfeno, formyl, thioformyl, preferably halogen, C1 to 18 alkyl, C2 to 18 alkenyl, C2 to 18 alkinyl, and C1 to 18 alkoxy.

Suitable commercially available aromatic dihydroxy compounds from which the divalent residue K can be obtained by removing two aromatic hydroxy groups are listed below by way of example: hydroquinone, naphthalenediols such as e.g. 1,2-naphthalenediol, 2,6-naphthalenediol, 2,7-naphthalenediol, bis-(4-hydroxyphenyl), 2,2-bis-(4-hydroxyphenyl)propane, bis-(4-hydroxyphenyl)sulfide, bis-(4-hydroxyphenyl)ether, bis-(4-hydroxyphenyl)ketone, bis-(4-hydroxyphenyl)sulfone, bis-(4-hydroxyphenyl)methane, 1,1-bis-(4-hydroxyphenyl)cyclohexane, α,α-bis-(4-hydroxyphenyl)-p-diisopropylbenzene, 1,1-bis-(4-hydroxyphenyl)-1-phenylethane, 2,2-bis-(3-methyl-4-hydroxyphenyl)propane, 2,2-bis-(3,5-dichloro-4-hydroxyphenyl)propane, 2,2-bis-(3,5-dibromo-4-hydroxyphenyl)propane, 2,2-bis-(3,5-dimethyl-4-hydroxyphenyl)propane, bis-(3,5-dimethyl-4-hydroxyphenyl)methane, 2,2-bis-(3,5-dimethyl-4-hydroxyphenyl)butane, bis-(3,5-dimethyl-4-hydroxyphenyl), and 1,1,3,4,6-pentamethyl-3-(3,5-dimethyl-4-hydroxyphenyl)indan-5-ol, particularly preferably bis-(4-hydroxyphenyl), 2,2-bis-(4-hydroxyphenyl)propane, and 2,2-bis-(3,5-dimethyl-4-hydroxyphenyl)propane, bisphenol TMC, very particularly preferably 2,2-bis-(4-hydroxyphenyl)propane.

The divalent residue L is obtained formally by the removal of two terminal hydroxy groups from polyethers. Preferred residues L are selected, in each repeating unit and in each of formulas (I), (III), and optionally (V), mutually independently, from divalent residues of the general formula (VIII)

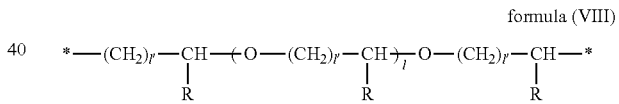

formula (VIII)

where l is a number from 0 to 5000, each l' in formula (VIII) and in each repeating unit denotes, mutually independently, a number from 1 to 10, and each R in formula (VIII) and in each repeating unit is selected, mutually independently, from hydrogen or linear or branched, optionally substituted C1 to 12 alkyl groups, R denoting in particular hydrogen or methyl.

In preferred divalent residues of the general formula (VIII), l denotes a number from 1 to 200, by preference a number from 3 to 50, and particularly preferably a number from 5 to 20, and/or l' denotes in formula (VIII) and in each repeating unit, mutually independently, 1, 2, 3, 4, 5, 6, 7, or 8, in particular 1 or 3.

In order to achieve effective impact modification, it is advantageous that each residue L have, before the removal of two terminal hydroxyl groups, a weight-average molecular weight ($M_w$) from 200 to 10,000 g/mol, by preference from 300 to 5000 g/mol, and in particular from 500 to 2000 g/mol. It is furthermore advantageous that each residue L have, before the removal of two terminal hydroxyl groups, a glass transition temperature ($T_g$) that is lower than 20° C., by preference lower than 10° C., and particularly preferably lower than 0° C.

In the context of the present invention, the weight-average molecular weight ($M_w$) can be determined by gel permeation chromatography (GPC) using polystyrene as a standard. The glass transition temperature ($T_g$) can be determined in the context of the present invention by dynamic mechanical thermoanalysis (DMTA), the respective glass transition temperature being obtained from the maximum value of the loss modulus vs. temperature diagram.

As indicated earlier, component C2 can be manufactured by reacting at least one component X with at least one component Y, component X being selected from the group made up of:
(X-1) aromatic compounds having at least two aromatic hydroxy groups, and
(X-2) polyethers having at least two terminal hydroxy groups, and component Y being selected from the group made up of
(Y-1) polyethers having at least two terminal oxirane groups, and
(Y-2) aromatic compounds of the general formula (II) indicated above.

In the manufacture of the oligomeric or polymeric urethane-group-free polyether compound, one or more component(s) X is/are therefore reacted with one or more component(s) Y, in which context all the components used have a different chemical structure.

The term "reaction solely between" is understood for purposes of the present invention to mean that the reaction of two components occurs without the presence, in the context of the reaction, of at least one component that meets none of the definitions of the aforesaid components.

The reaction between one or more component(s) that meet the definition of (X-1) and one or more component(s) that meet the definition of (Y-2) is thus, for purposes of the present invention, excluded only for the case in which, in the context of the reaction, no component that does not meet the respective definition of (X-1) and (Y-2) is present.

The reaction between one or more components that meet the definition of (X-2) and one or more components that meet the definition of (Y-1) is furthermore, for purposes of the present invention, excluded only for the case in which, in the context of the reaction, no component that does not meet the respective definition of (X-2) and (Y-1) is present.

The aforesaid sole reactions are excluded in the context of the present invention because the resulting reaction products provide only insufficient improvement of the fracture-mechanics properties of the hardened polymerizable compositions. It thus appears to be necessary, for purposes of the present invention, for the oligomeric or polymeric urethane-group-free polyether compounds to encompass both aromatic and polyether-based structural elements in order to be effective as toughness promoters in a hardened epoxy resin matrix.

In the reaction of the individual components with one another, hydroxy groups of one component react, in particular, with terminal oxirane groups of another component, forming an oligomeric or polymeric urethane-group-free polyether compound.

The above-described reaction occurs, depending on the reactivity of the individual components, by preference at temperatures from 20 to 250° C., for example at 100° C. to 180° C. The reaction time likewise depends on the reactivity of the components used, and is equal to, by preference, 10 min to 12 h, in particular 1 h to 6 h; the reaction can be carried out in a suitable solvent such as, for example, toluene, or without solvent.

In a preferred embodiment of the present invention, the reaction of the individual components is carried out in the presence of at least one suitable catalyst. Suitable catalysts accelerate the reaction of hydroxy groups with terminal oxirane groups and are selected in this context, in particular, from tetraalkylammonium salts, for example tetrabutylammonium bromide, tertiary amines, for example 1,8-diazabicyclo[5.4.0]undec-7-ene (DBU), aryl/alkyl phosphines, for example triphenyl phosphine, or ureas, for example Versamin EH-50.

In a further preferred embodiment of the present invention, reaction of the individual components is carried out in the presence of at least one crosslinking agent. Suitable crosslinking agents can be selected, for example, from diols, triols, tetraols, and polyols that comprise at least five hydroxyl groups.

Preferred components (X-1) are selected in the context of the present invention from compounds of the general formula (VIIa)

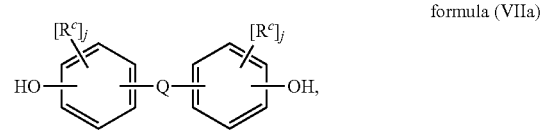

formula (VIIa)

the definitions indicated previously with respect to formula (VII) being applicable.

Preferred components (X-1) can furthermore also be selected from compounds of the general formula (VIa)

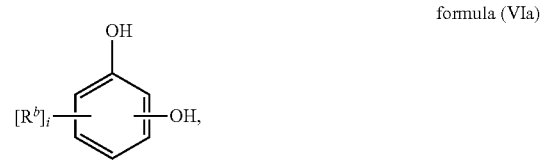

formula (VIa)

where i denotes a number from 0 to 4 and $R^b$ is selected from halogen, in particular fluorine, chlorine, bromine, or iodine, C1 to 40 alkyl, for example methyl, ethyl, isopropyl, C2 to 40 alkenyl, C1 to 40 alkoxyl, and C7 to 13 aralkyl. Residue $R^b$ in formula (VIa) can also be a divalent residue that turns the phenyl group into a corresponding naphthyl group. In specific embodiments of the present invention, residues $R^b$ and $R^c$, if present, can encompass at least one further structural element of the general formula (I).

It is particularly advantageous in the context of the present invention to select component (X-1) from aromatic compounds having two aromatic hydroxy groups. Suitable aromatic compounds having two aromatic hydroxy groups are, for example, hydroquinone, naphthalenediols such as e.g. 1,2-naphthalenediol, 2,6-naphthalenediol, 2,7-naphthalenediol, bis-(4-hydroxyphenyl), 2,2-bis-(4-hydroxyphenyl)propane, bis-(4-hydroxyphenyl)sulfide, bis-(4-hydroxyphenyl) ether, bis-(4-hydroxyphenyl)ketone, bis-(4-hydroxyphenyl) sulfone, bis-(4-hydroxyphenyl)methane, 1,1-bis-(4-hydroxyphenyl)cyclohexane, α,α'-bis-(4-hydroxyphenyl)-p-diisopropylbenzene, 1,1-bis-(4-hydroxyphenyl)-1-phenylethane, 2,2-bis-(3-methyl-4-hydroxyphenyl)propane, 2,2-bis-(3,5-dichloro-4-hydroxyphenyl)propane, 2,2-bis-(3,5-dibromo-4-hydroxyphenyl)propane, 2,2-bis-(3,5-dimethyl-4-hydroxyphenyl)propane, bis-(3,5-dimethyl-4-hydroxyphenyl)methane, 2,2-bis-(3,5-dimethyl-4-hydroxyphenyl)butane, bis-(3,5-dimethyl-4-hydroxyphenyl), and 1,1,3,4,6-pentamethyl-3-(3,5-dimethyl-4-hydroxyphenyl)indan-5-ol, particularly preferably bis-(4-hydroxyphenyl), 2,2-bis-(4-hydroxyphenyl)propane, and 2,2-bis-(3,5-dimethyl-4-hydroxphenyl) propane, bisphenol TMC, very particularly preferably 2,2-bis-(4-hydroxyphenyl)propane.

Component (X-2) denotes polyethers having at least two hydroxy groups.

In a preferred embodiment of the invention, component (X-2) is selected from non-aromatic polyethers having at least two terminal hydroxy groups. The term "non-aromatic polyethers" is to be understood for purposes of the present invention to mean polyethers that do not encompass an aromatic structural element.

Preferred components (X-2) are selected from compounds of the general formula (IX)

formula (IX)

where m is a number from 2 to 100 and P denotes an m-valent polyalkylene oxide residue such as, for example, an m-valent non-aromatic polyalkylene oxide. By preference, m is a number from 2 to 50, particularly preferably from 2 to 10 and very particularly preferably from 2 to 4, m denoting in particular 2. The m-valent polyalkylene oxide residue P can have a linear or branched structure.

By using polyethers having two terminal hydroxy groups as component (X-2) it is possible to construct oligomeric or polymeric urethane-group-free polyether compounds that have a linear structure and exhibit good compatibility with the epoxy resin matrix.

By using polyethers having more than two terminal hydroxy groups as component (X-2) it is possible to construct oligomeric or polymeric urethane-group-free polyether compounds having a branched structure.

Suitable components (X-2) can be selected, for example, from compounds of the general formula (VIIIa)

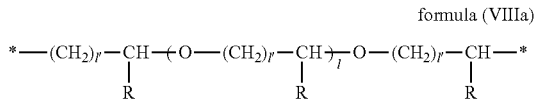

formula (VIIIa)

where an OH group replaces the symbol *, and the definitions indicated earlier in connection with formula (VIII) are applicable.

Component (Y-1) denotes polyethers having at least two terminal oxirane groups. In a preferred embodiment of the invention, component (Y-1) is selected from non-aromatic polyethers having at least two terminal oxirane groups. The term "non-aromatic polyethers" is as defined above.

Component (Y-1) is selected by preference from compounds of the general formula (X)

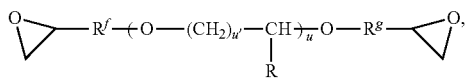

formula (X)

where u is a number from 2 to 5000, each u' in each repeating unit denotes, mutually independently, a number from 1 to 10, each residue $R^f$ and $R^g$, mutually independently in each case, denotes a divalent connecting group that encompasses 1 to 100 carbon atoms, and each R in formula (X) and in each repeating unit is selected, mutually independently, from hydrogen or linear or branched, optionally substituted C1 to 12 alkyl groups, R denoting in particular hydrogen or methyl.

In particular, u in formula (X) denotes a number from 1 to 200, by preference a number from 3 to 50, and particularly preferably a number from 5 to 20, and/or u' in formula (X) and in each repeating unit denotes, mutually independently, 1, 2, 3, 4, 5, 6, 7, or 8, in particular 1 or 3.

In preferred embodiments of the present invention, the residues $R^f$ and $R^g$ in formula (X) are selected, mutually independently, from alkylene groups that comprise 1 to 10 atoms. The residues $R^f$ and $R^g$ in formula (X) are selected in particular, mutually independently, from linear alkylene groups that encompass 1 to 6, in particular 1 or 2 carbon atoms, such as e.g. methylene and ethylene groups, $R^f$ and $R^g$ particularly preferably denoting a methylene group (—$CH_2$—).

Diglycidyl ethers of polyethers that are suitable as component (Y-1) are obtainable, for example, under the commercial names DER-732, DER-736 (Dow Chemical Co.) or as Adeka ED-506 (Adeka Corporation), or can be manufactured by the reaction, known to one skilled in the art, of polyether polyols with epichlorohydrin.

Component (Y-2) is, as indicated previously, an aromatic compound of the general formula (II). In a preferred embodiment of the invention, component (Y-2) is selected from compounds of the general formula (XI)

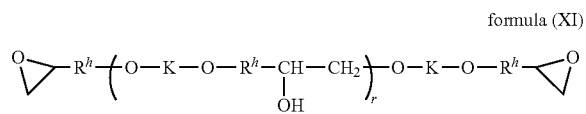

formula (XI)

where r is a number from 0 to 10, $R^h$ in formula (XI) and in each repeating unit is selected, mutually independently, from alkylene groups that encompass 1 to 10 carbon atoms, and K in formula (XI) and in each repeating unit denotes, mutually independently, a divalent residue of aromatic dihydroxy compounds after removal of the two hydroxy groups.

In a preferred embodiment of the invention, r is a number from 0 to 2, in particular from 0 to 1, such as, for example, 0, 0.1, 0.2, 0.3, 0.4, 0.5, 0.7, 0.8, 0.9, 1.

$R^h$ is selected in particular from linear alkylene groups that encompass 1 to 6 carbon atoms, in particular 1 or 2 carbon atoms, for example methylene and ethylene groups, $R^f$ particularly preferably denoting a methylene group (—$CH_2$—).

The divalent residue K is obtained formally by the removal of two hydroxy groups from aromatic dihydroxy compounds. Preferred residues K have been defined previously by the general formulas (VI) and (VII).

Suitable as component (Y-2) are, in particular, diglycidyl ethers of bisphenol A or bisphenol F which are obtainable, for example, under the commercial names Epon 825, Epon 826, Epon 828, Epon 830, Epon 862, Epon 1001 (Hexion Specialty Chemicals Inc.) or DER-331, DER-332, DER-334 (Dow Chemical Co.).

The aforesaid compounds can also be manufactured by reacting one or more suitable biphenolic compounds with epichlorohydrin.

Component (Y-2) can furthermore be selected from compounds in which residue D in formula (II) encompasses at least one aromatic group that comprises at least one functional group of the following formula:

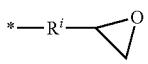

where $R^i$ denotes a divalent connecting group that encompasses 1 to 100 carbon atoms. $R^i$ denotes, in particular, an alkylene group having 1 to 10 carbon atoms, for example methylene or ethylene.

Suitable residues D in formula (II) can be selected, for example, from the following aromatic residues:

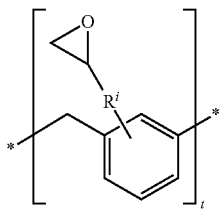

where $R^i$ is as defined above and t is a number from 1 to 100,000, in particular from 1 to 10,000, particularly preferably from 1 to 1000.

Corresponding components (Y-2) are, for example, glycidyl ethers of phenol resins such as, for example, glycidyl ethers of novolac resins.

In a preferred embodiment of the present invention, the oligomeric or polymeric urethane-group-free polyether compound is obtained by reacting at least one component (X-1) with at least one component (Y-1) in the presence of at least one component (Y-2).

The oligomeric or polymeric urethane-group-free polyether compounds thereby obtained have greater effectiveness as impact modifying agents as compared with comparable products that are obtained by the reaction solely between at least one component (X-1) and at least one component (Y-1).

The molar ratio of the individual aforesaid components in the context of the reaction is selected by preference so that the oligomeric or polymeric urethane-group-free polyether compound obtained comprises exclusively terminal oxirane groups.

For purposes of the present invention it is advantageous if at least one oligomeric or polymeric urethane-group-free polyether compound is manufactured by reacting least one component A with at least one component B, component A being selected from the group made up of:

(X-1) aromatic compounds having at least two aromatic hydroxy groups, and (X-2) non-aromatic polyethers having at least two terminal hydroxy groups, and component B being selected from the group made up of (Y-1) non-aromatic polyethers having at least two terminal oxirane groups, and (Y-2) aromatic compounds of the general formula (II)

formula (II)

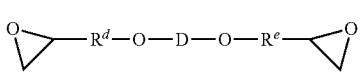

where each residue $R^d$ and $R^e$ denotes, mutually independently in each case, a divalent connecting group that encompasses 1 to 100 carbon atoms, and residue D encompasses at least one aromatic group, with the provision that the reaction solely between one or more component(s) that meet the definition of (X-1) and one or more components(s) that meet the definition of (Y-2), and the reaction solely between one or more components that meet the definition of (X-2) and one or more components that meet the definition of (Y-1), is excluded.

As defined above, the term "non-aromatic polyethers" is to be understood for purposes of the present invention to mean polyethers that do not encompass an aromatic structural element.

The aforesaid oligomeric or polymeric urethane-group-free polyether compound allows the manufacture of polymerizable compositions that exhibit particularly good fracture-mechanics properties in the cured state.

It is particularly advantageous for purposes of the present invention to react at least one component (X-1), selected from compounds of the general formula (VIIb)

formula (VIIb)

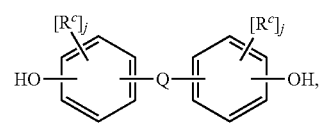

where j denotes a number from 0 to 4; Q is selected from the group made up of alkylene, oxygen, sulfur, sulfoxide, sulfone, and a direct covalent bond, and each residue $R^c$ is selected mutually independently from halogen, in particular fluorine, chlorine, bromine, or iodine, C1 to 40 alkyl, for example methyl, ethyl, isopropyl, C2 to 40 alkenyl, C1 to 40 alkoxyl, and C7 to 13 aralkyl, with at least one component (Y-1) selected from compounds of the general formula (Xa)

formula (Xa)

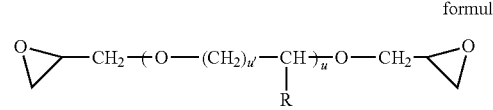

where u is a number from 2 to 5000, each u' in each repeating unit denotes, mutually independently, a number from 1 to 10, and each R in formula (Xa) and in each repeating unit is selected, mutually independently, from hydrogen or linear or branched, optionally substituted C1 to 12 alkyl groups, R denoting in particular hydrogen or methyl, in the presence of at least one component (Y-2), component (Y-2) being selected from compounds of the general formula (XIa)

formula (XIa)

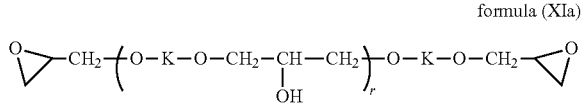

where r is a number from 0 to 10, and K in formula (XIa) and in each repeating unit denotes, mutually independently, a divalent residue of aromatic dihydroxy compounds after removal of the two hydroxy groups.

The molar ratio of component (X-1) to component Y (Y-1+Y-2) is, in particular, between 1:1.01 and 1:1.6, by preference between 1:1.1 and 1:1.3.

It is preferable to use as component Y a polyether having terminal epoxy groups and an epoxy equivalent weight of between 1000 and 3000 g/mol, having continuous polypropylene oxide blocks of 5 to 18 repeating $C_3H_6O$ units and aromatic blocks that comprise at least one phenylene structural unit.

It is further preferred that component Y be the reaction product of polypropylene oxide diglycidyl ethers having an epoxy equivalent weight of between 170 and 400 g/mol, bisphenol A, and a diglycidyl ether of bisphenol A or bisphenol F having an epoxy equivalent weight of between 156 and 550 g/mol and an epoxy equivalent weight of the reaction product of between 1000 and 3000 g/mol.

The resin component according to the present invention can comprise one or more of the above-described oligomeric or polymeric urethane-group-free polyether compounds C2) in quantities from 2 to 60 wt %, by preference from 5 to 40 wt %, and greatly preferably from 10 to 30 wt %, based in each case on the total quantity of the resin component.

A further preferred embodiment is characterized in that the resin component, and also the complete adhesives, matrix materials for composites, or structural foams formulated therewith, do not comprise a benzoxazine compound. As compared with formulations that comprise benzoxazine compounds, the benzoxazine-free products have a lower viscosity in the unhardened state and a greater elongation at fracture in the hardened state. Hardening can occur at lower temperatures.

In a further preferred embodiment, the resin component additionally comprises elastomer particles that have a core-shell structure. Examples thereof are rubber particles having a core-shell structure. It is preferred in this context that the rubber particles having a core-shell structure comprise a core made of polymer material having a glass transition temperature below 0° C. and a casing made of a polymer material having a glass transition temperature above 25° C. Particularly suitable rubber particles having a core-shell structure can comprise a core made of a diene homopolymer, a diene copolymer, or a polysiloxane elastomer, and/or a shell made of an alkyl (meth)acrylate homopolymer or copolymer.

The core of these core-shell particles can, for example, comprise a diene homopolymer or copolymer, which can be selected from a homopolymer of butadiene or isoprene, a copolymer of butadiene or isoprene with one or more ethylenically unsaturated monomers, for example vinyl aromatic monomers, (meth)acrylonitrile, (meth)acrylates, or similar monomers. The polymer or copolymer of the shell can comprise as monomers, for example: (meth)acrylates such as in particular methyl methacrylate, vinyl aromatic monomers (e.g. styrene), vinyl cyanides (e.g. acrylonitrile), unsaturated acids or anhydrides (e.g. acrylic acid), (meth)acrylamides, and similar monomers that result in polymers having a suitably high glass temperature. Other rubber-like polymers, for example poly(butyl acrylate), or polysiloxane elastomers, for example polydimethylsiloxane, in particular crosslinked polydimethylsiloxane, can also be used as a core.

These core-shell particles are typically constructed so that the core accounts for 50 to 95 wt % of the core-shell particle, and the shell for 5 to 50 wt % of said particle.

By preference, these rubber particles are relatively small. For example, the average particle size (as determinable, for example, using light scattering methods) can be in the range from approximately 0.03 to approximately 2 µm, in particular in the range from approximately 0.05 to approximately 1 µm. Smaller core-shell particles can, however, also be used, for example those whose average diameter is less than approximately 500 nm, in particular less than approximately 200 nm.

For example, the average particle size can be in the range from approximately 25 to approximately 200 nm.

The manufacture of such core-shell particles is known in the existing art, as indicated for example on page 6, lines 16 to 21 of WO 2007/025007. Core-shell particles whose manufacture is described in U.S. Pat. No. 7,485,680 can also be used.

Inorganic particles that comprise a casing made of organic polymers can take on the same function as the rubber particles recited above having a core-shell structure. A further preferred embodiment of the present invention is therefore characterized in that the resin component according to the present invention comprises, as an additional component, inorganic particles that comprise a casing made of organic polymers, the organic polymers preferably being selected from homo- or copolymers of acrylic acid esters and/or methacrylic acid esters, and being made up of at least 30 wt % polymerized-in esters of acrylic acid and/or methacrylic acid.

The proportion of elastomer particles, without other constituents of the raw material comprising the elastomer particles, in terms of the total quantity of polymerizable preparation is by preference equal to 0 to 30 wt %, particularly preferably 0 to 20 wt %, and greatly preferably 5 to 15 wt %.

In addition to or instead of the elastomer particles recited above, the resin component can comprise at least one further impact modifier/toughener. Those polymers recited for this purpose in the literature cited above can be used, for example, for this. These and further examples are:

Thermoplastic polyurethane that can be reactive or non-reactive. In a preferred embodiment the thermoplastic polyurethane is non-reactive, in the sense that it is not further crosslinkable. This can refer, in particular, to a polyurethane that comprises a polyester chain. The term "thermoplastic polyurethane" (often abbreviated "TPU") is known to one skilled in the art under discussion here. Suitable thermoplastic polyurethanes are obtainable commercially and can be acquired on the basis of these specifications, for example, from the Merquinsa company in Spain or from Danquinsa GmbH in Germany.

Instead of or together with the reactive (crosslinkable) or non-reactive (non-crosslinkable) thermoplastic polyurethanes, the resin component can comprise block copolymers having thermoplastic polymer blocks. These are by preference selected from those that comprise a first polymer block having a glass transition temperature below 15° C., in particular below 0° C., and a second polymer block having a glass transition temperature above 25° C., in particular above 50° C. Also suitable are those block copolymers that are selected from those in which a first polymer block is selected from a polybutadiene or polyisoprene block, and a second polymer block is selected from a polystyrene or polymethyl methacrylate block.

The block copolymer is selected, for example, from copolymers having the following block configuration: styrene-butadiene-(meth)acrylate, styrene-butadiene-(meth)acrylic acid ester, ethylene-(meth)acrylic acid ester-glycidyl (meth)acrylic acid ester, ethylene-(meth)acrylic acid ester-maleic acid anhydride, (meth)acrylic acid ester-butyl acrylate-(meth)acrylic acid ester, by preference methyl methacrylate-butyl acrylate-methyl methacrylate.

The block copolymers recited above correspond to those that can also be used in the context of WO 2007/025007. More detailed information thereon, and further block copolymers also suitable in the context of the present invention, may be gathered from page 25, line 21 to page 26, line 9 of that document.

The further impact modifier/toughener can also be a reaction product of epoxy resin C1) of the resin component according to the present invention with polymers that represent or comprise soft segments. A preferred embodiment therefore consists in the fact that the further impact modifier is the reaction product of a carboxyl-group-containing copolymer based on butadiene-acrylonitrile with a stoichiometric excess of an epoxy resin in accordance with C1). A further advantageous embodiment is such that the further impact modifier/toughener is the reaction product of an amino-group-containing polyether with a stoichiometric excess of an epoxy resin in accordance with C1). For details in this regard, the reader is referred to the document WO 2007/025007 cited earlier.

The proportion of the further impact modifier in terms of the total quantity of the polymerizable preparation is by preference equal to 0 to 30 wt %, particularly preferably 0 to 20 wt %, and greatly preferably 5 to 15 wt %.

The resin component according to the present invention can serve as one component of a two-component adhesive whose second component represents or comprises a hardener for epoxy resins. The present invention therefore relates, in a further aspect, to a two-component adhesive whose first component is or comprises a resin component according to the present invention as described above, and whose second component represents a hardener component that is or comprises at least one amino-group-containing compound or at least one thiol-group-containing compound. Those amine or thiol hardeners that are known to one skilled in the art as hardener components for two-components epoxy adhesives can be used, in general, for this. Examples of these are the di- or trifunctional amino-terminated polyalkylene glycols known as "Jeffamine™ D" or "Jeffamine™ T," in particular based on ethylene oxide and/or propylene oxide. Further examples are polyaminoamides (preferably various grades of Versamid™, Aradur™, or Ancamide™), polyamines (preferably diethylenetriamine, triethylenetetramine, tetraethylenepentaamine, pentaethylenehexamine, Aradur™, Ancamin™, Lauromin™), cycloaliphatic polyamines (preferably Ancamine™, Lauromine™), polyaminoimidazoline (preferably Versamid™), aralkylamines (preferably MXDA), aromatic amines (preferably 4,4'-diaminodiphenylsulfone, MDA), polymercaptans (preferably Capcure™ 3-800), carboxylic acid anhydrides (preferably polysebacic acid polyanhydride, polyazelaic acid polyanhydride, succinic acid anhydride, citraconic acid anhydride, itaconic acid anhydride, alkenyl-substituted succinic acid anhydrides, dodecenylsuccinic acid anhydride, maleic acid anhydride, tricarballylic acid anhydride, nadic anhydride, methylnadic anhydride, linoleic acid adduct with maleic acid anhydride, alkylated endoalkylenetetrahydrophthalic acid anhydrides, methyltetrahydrophthalic acid anhydride, tetrahydrophthalic acid anhydride, hexahydrophthalic acid anhydride, pyromellitic acid dianhydride, trimellitic acid anhydride, phthalic acid anhydride, tetrachlorophthalic acid anhydride, tetrabromophthalic acid anhydride, dichloromaleic acid anhydride, chloronadic anhydride and chlorendic anhydride, and maleic acid anhydride-grafted polybutadiene; particularly preferably methylnadic anhydride, methyltetrahydrophthalic acid anhydride, and tetrahydrophthalic acid anhydride).

The resin system according to the present invention can also, however, have a latent hardener for epoxides added to it so as to produce a thermally curable one-component composition. The present invention therefore relates, in a further aspect, to a thermally hardenable composition comprising a resin component according to the present invention as described above and C3) at least one latent hardener for component C1).

Latent hardeners of this kind for epoxy resins are known to one skilled in the art. These can be selected, for example, from the following compounds: guanidines, substituted guanidines, substituted ureas, melamine resins, guanamine derivatives, cyclic tertiary amines, aromatic amines, and/or mixtures thereof. The hardeners can be incorporated stoichiometrically into the hardening reaction, but also can be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and very particularly cyanoguanidine (dicyandiamide). Representatives of suitable guanamine derivatives that may be recited are alkylated benzoguanamine resins, benzoguanamine resins, or methoxymethylethoxymethylbenzoguanamine. Dicyandiamide is preferably suitable.

In addition to or instead of the aforesaid hardeners, catalytically active substituted ureas can be used. These are, in particular, p-chlorophenyl-N,N-dimethylurea (monuron), 3-phenyl-1,1-dimethylurea (fenuron), or 3,4-dichlorophenyl-N,N-dimethylurea (diuron). In principle, catalytically active tertiary acrylamines or alkylamines such as, for example, benzyldimethylamine, tris(dimethylamino)phenol, piperidine, or piperidine derivatives can also be used. In addition, a variety of (by preference, solid) imidazole derivatives can be used as catalytically active accelerators. Representatives that may be named are 2-ethyl-2-methylimidazole, N-butylimidazole, benzimidazole, and N—$C_1$ to $C_{12}$ alkylimidazoles or N-arylimidazoles. Adducts of amino compounds with epoxy resins are also suitable as accelerating additives to the aforesaid hardeners.

Suitable amino compounds are tertiary aliphatic, aromatic, or cyclic amines. Suitable epoxy compounds are, for example, polyepoxides based on glycidyl ethers of bisphenol A or F, or of resorcinol. Specific examples of such adducts are adducts of tertiary amines such as 2-dimethylaminoethanol, N-substituted piperazines, N-substituted homopiperazines, N-substituted aminophenols, with di- or polyglycidyl ethers of bisphenol A or F or of resorcinol.

This thermally hardenable composition preferably comprises, based on the entire composition, 88 to 99 wt %, in particular 93 to 97 wt % of the resin system according to the present invention and 1 to 12 wt %, in particular 3 to 7 wt % of the aforesaid latent hardeners.

Carboxylic acids or carboxylic acid anhydrides can also be used as latent hardeners for epoxy resins. Examples of suitable carboxylic acid hardeners are: aliphatic dicarboxylic acids such as oxalic acid, malonic acid, succinic acid, glutaric acid, adipic acid, pimelic acid, suberic acid, azelaic acid, sebacic acid, 3,6,9-trioxaundecanedioic acid, or dimerized or trimerized linoleic acid; cycloaliphatic polycarboxylic acids such as, for example, tetrahydrophthalic acid, 4-methyltetrahydrophthalic acid, hexahydrophthalic acid, and 4-methylhexahydrophthalic acid; aromatic dicarboxylic acids such as phthalic acid, isophthalic acid, terephthalic acid, or naphthalic acid; or diester-dicarboxylic acids, which are obtainable, for example, by reacting glycols, e.g. polypropylene glycol, with two equivalents of dicarboxylic acid anhydride such as, for example, tetrahydrophthalic acid anhydride.

Suitable anhydride hardeners are, in principle, all anhydrides of di- and higher-functional carboxylic acids, such as linear aliphatic polymeric anhydrides and cyclic carboxylic acid anhydrides. Examples of suitable anhydride hardeners are: polysebacic acid polyanhydride, polyazelaic acid polyanhydride, succinic acid anhydride, citraconic acid anhydride, itaconic acid anhydride, alkenyl-substituted succinic acid anhydrides, dodecenylsuccinic acid anhydride, maleic acid anhydride, tricarballylic acid anhydride, nadic anhydride, methylnadic anhydride, linoleic acid adduct with maleic acid anhydride, alkylated endoalkylenetetrahydrophthalic acid anhydrides, methyltetrahydrophthalic acid anhydride, tetrahydrophthalic acid anhydride, hexahydrophthalic acid anhydride, pyromellitic acid dianhydride, trimellitic acid anhydride, phthalic acid anhydride, tetrachlorophthalic acid anhydride, tetrabromophthalic acid anhydride, dichloromaleic acid anhydride, chloronadic anhydride and chlorendic anhydride.

It is preferable to use dicarboxylic acid anhydrides that are liquid at 22° C., or that melt easily (i.e. below 60° C.) as epoxy resin hardeners. Particularly preferred anhydride hardeners are methylnadic anhydride, tetrahydrophthalic acid anhydride, and methyltetrahydrophthalic acid anhydride; methylnadic anhydride and methyltetrahydrophthalic acid anhydride are preferably used as an isomer mixture.

This thermally hardenable composition preferably comprises, based on the entire composition, 35 to 96 wt %, in particular 45 to 75 wt % of the resin system according to the present invention and 4 to 65 wt %, in particular 25 to 55 wt % carboxylic acid resp. carboxylic acid anhydride as latent hardeners.

Both the two-component adhesive and the thermally hardenable composition can be used as a structural adhesive or as a matrix for a composite, this comprising a further embodiment of the present invention. The structural adhesive can be utilized in particular for joining parts in shipbuilding, aircraft construction, and in particular in vehicle construction. It is notable for high strength on the one hand and on the other hand for high levels of toughness and elongation at fracture, i.e. in general for desirable, favorable fracture characteristics.

If a blowing agent (also referred to as a "foaming agent") is additionally added to the thermally hardenable composition described above, an expandable and hardenable preparation is obtained that can serve as a structural foam for reinforcing components, in particular hollow components. It can be utilized to reinforce components in vehicle construction, in particular in automobile construction. A further embodiment of the present invention thus consists in the fact that it additionally comprises
C4) a physical or chemical blowing agent.

All known blowing agents are suitable in principle as a blowing agent, for example the "chemical blowing agents" that release gases by decomposition, or "physical blowing agents," i.e. expanding hollow spheres. Examples of the former blowing agents are azobisisobutyronitrile, azodicarbonamide, dinitrosopentamethylenetetramine, 4,4'-oxybis(benzenesulfonic acid hydrazide), diphenylsulfone-3,3'-disulfohydrazide, benzene-1,3-disulfohydrazide, p-toluenesulfonyl semicarbazide. The expandable hollow plastic microspheres based on polyvinylidene chloride copolymers or acrylonitrile-(meth)acrylate copolymers are particularly preferred. These are commercially obtainable, for example, under the names "Dualite®" resp. "Expancel®" from the Pierce & Stevens resp. Casco Nobel companies.

The quantity of blowing agent is preferably selected so that the volume of compound irreversibly increases, upon heating to activation temperature (or expansion temperature), by at least 10%, by preference at least 20%, and in particular at least 50%. This is to be understood to mean that upon heating to activation temperature the substance, in addition to the normal reversible thermal expansion in accordance with its coefficient of thermal expansion, irreversibly increases its volume, as compared with the initial volume at room temperature (22° C.), in such a way that after being cooled back to room temperature it is larger than before to the extent recited. The expansion factor indicated thus refers to the volume of the substance at room temperature before and after temporary heating to activation temperature. The upper limit of the expansion factor can be set by selecting the quantity of blowing agent, in such a way that it reaches values of up to 1000% or even up to 2000%. For many applications, however, it is sufficient to use a quantity of blowing agent such that the upper limit of the expansion factor is less than 300%, in particular less than 200%.

In this embodiment, the thermally foamable and hardenable composition by preference comprises, based on the entire composition:
76 to 98.9 wt %, in particular 89 to 96 wt % of the resin system according to the present invention,
1 to 12 wt %, in particular 3 to 7 wt % latent hardener, and
0.1 to 12 wt %, in particular 1 to 4 wt % blowing agent.

The activation temperature is by preference in the range from 120 to 220° C., in particular 100 to 200° C., regardless of whether the thermally hardenable composition comprises a blowing agent or not. This temperature is by preference to be maintained for a period of time in the range from 5 to 150 minutes.

This thermally hardenable and foamable composition can be used as structural foam, this constituting a further embodiment of the invention. It can be used to reinforce and/or seal cavities, in particular cavities in metallic structures. It can be utilized for this purpose, for example, in shipbuilding, aircraft construction, and in particular in vehicle construction. In this application as well, it is notable for high strength on the one hand and on the other hand for high levels of toughness and elongation at fracture, i.e. in general for desirable, favorable fracture characteristics.

As a rule, the compositions according to the present invention further comprise, alongside the above-described oligomeric or polymeric urethane-group-free polyether compounds, additives such as, for example, milled or precipitated chalks, carbon black, calcium magnesium carbonates, barite, and in particular silicate fillers of the aluminum magnesium calcium silicate type, for example wollastonite or chlorite.

The compositions according to the present invention can furthermore comprise other additives such as, for example, plasticizers, reactive diluents, further impact modifying agents, rheology adjuvants, wetting agents, aging protection agents, stabilizers, and/or color pigments. The compositions are, however, preferably free of plasticizers.

To allow utilization as a one- or two-component structural adhesive, as a matrix material for composites, or as a structural foam, it is preferred that the ready-to-harden composition (i.e. the composition immediately before onset of the hardening reaction) comprise as little organic solvent as possible. This is understood to mean substances that are liquid at 22° C., have a boiling point of less than 300° C. at standard pressure, and are not chemically incorporated into the resulting polymer network in the course of the hardening reaction. The ready-to-harden composition is therefore intended to comprise, based on the entire composition, no more than 20 wt %, by preference no more than 10 wt %, in particular no more than 5 wt %, and especially preferably no more than 1 wt % organic solvent.

A further subject of the present invention is, in general, the polymerization product of the resin components according to the present invention. It has a high modulus of elasticity and a high flexural modulus, as well as high values for tensile strength and impact toughness. The present invention thus also encompasses an object that comprises at least two structural components that have been adhesively bonded with a two-component adhesive described above, or with a thermally hardenable composition described above. The present invention furthermore encompasses an object that comprises a foamed and cured composition as described above.

EXEMPLIFYING EMBODIMENTS

In the context of the present invention, the weight-average molecular weight ($M_w$) can be determined by gel permeation chromatography (GPC) using polystyrene as a standard. The glass transition temperature ($T_g$) can be determined in the context of the present invention by dynamic mechanical thermoanalysis (DMTA), the respective glass transition temperature being obtained from the maximum value of the loss modulus vs. temperature diagram.

The flexural strength and flexural modulus were determined in accordance with ASTM D790, using in each case a test specimen 90 mm×12.7 mm×3.2 mm in size, span=50.8 mm, and speed=1.27 mm/min.

The critical stress intensity factor K1C and the G1C value (fracture energy) were determined in accordance with ASTM D5045-96 using so-called single edge notch bending (SENB), a test specimen 56 mm×12.7 mm×3.2 mm in size being used in each case.

The E-modulus, elongation at fracture, and tensile strength were determined in accordance with ASTM D683 using a 10TH2A tensile tester, WN:139315 crosshead travel encoder, video extensometer, and ID:0 WN:139316 10 kN force sensor, using type I (ASTM D683) test specimens in each case.

Tensile shear strength was ascertained using a Zwick tensile tenser per DIN EN 1465 at room temperature, at a pulling rate of 10 mm/min.

Raw Materials Used:
DER 732 (DOW Chemical Company): polyoxypropylene-diglycidyl ether
DER 736 (DOW Chemical Company): polyoxypropylene-diglycidyl ether
DER 331 (DOW Chemical Company): bisphenol A epoxy resin
Bisphenol A
Tetrabutylammonium bromide ("TBAB")
Cardolite 2513 HP (Cardolite Corp.): cashew oil/epichlorohydrin polymer
DICY: Dyhard 100 SH (Evonik): dicyandiamide
Fenuron: Dyhard UR 300 (Evonik): 1,1-dimethyl-3-phenylurea
Kane Ace MX-153 (Kaneka): butadiene-acrylic core-shell polymer in epoxy resin
Jeffamine D-2000 (Huntsman): polyoxypropylenediamine, molar mass=2000
Adeka QR 9466 (Adeka): thermoplastic polyurethane
Cabosil TS 720 (Cabot): pyrogenic silicic acid
Capcure LOF (Cognis): polymercaptan epoxy hardener
Versamine EH-30 (Cognis): tris(dimethylaminomethyl)phenol.

"Epoxy equivalent weight" is abbreviated EEW.
General manufacturing procedure for components C2, hereinafter referred to as TEPO:
A reaction vessel having a stirrer is loaded with the corresponding quantities of epoxy prepolymer DER 732, DER 736, DER 331, bisphenol A, and the catalyst tetrabutylammonium bromide. The reaction vessel is heated to 150° C. with agitation. The reaction time is 3 to 5 hours.

General Manufacturing Procedure for Adhesives:
All the liquid components are mixed for 60 minutes at 90° C. under vacuum, DICY and Fenuron are added, and mixing continues for a further 30 minutes.

General Manufacturing Procedure for the Test Specimens of Comparison Examples 1 to 7 and Adhesives 1 to 21:
The hot formulation is placed in bubble-free fashion into a Teflon frame 15 cm×20 cm in size and 3 mm deep on an aluminum plate treated with a release agent, covered with a second aluminum plate treated with a release agent, mechanically secured between two steel plates, and hardened for 60 min at 180° C. The test specimens are sawn out of the hardened epoxy sheet after removal of the metal plates and the Teflon frame.

Comparison Example 1

175.0 g DER 331, 7.4 g Cardolite 2513 HP, 20.5 g DICY, 1.0 g Fenuron.
Flexural modulus: 2424+/−95 MPa; K1C, 1.01+/−0.05 MPa.
TEPO 1:
75.0 g DER 732, 46.8 g DER 331, 28.5 g bisphenol A, 0.75 g TBAB; EEW: 611.
Adhesive 1:
125.0 g DER 331, 7.4 g Cardolite 2513 HP, 16.6 g DICY, 1.0 g Fenuron, 50.0 g TEPO 1.
Flexural modulus: 2837+/−469 MPa, K1C, 1.30+/−0.02 MPa.
TEPO 2:
72.0 g DER 732, 44.9 g DER 331, 36.5 g bisphenol A, 0.46 g TBAB. EEW: 1000.
Adhesive 2:
125.0 g DER 331, 7.4 g Cardolite 2513 HP, 16.6 g DICY, 1.0 g Fenuron, 50.0 g TEPO 2.
Flexural modulus: 2541+/−365 MPa, K1C, 1.69+/−0.16 MPa.
TEPO 3:
69.0 g DER 732, 43.0 g DER 331, 39.3 g bisphenol A, 0.45 g TBAB. EEW: 1497.
Adhesive 3:
125.0 g DER 331, 7.4 g Cardolite 2513 HP, 6.6 g DICY, 1.0 g Fenuron, 50.0 g TEPO 3.
Flexural modulus: 2162+/−465 MPa, K1C, 2.72+/−0.16 MPa.
TEPO 4:
66.0 g DER 732, 41.1 g DER 331, 40.1 g bisphenol A, 0.44 g TBAB. EEW: 1902.
Adhesive 4:
125.0 g DER 331, 7.4 g Cardolite 2513 HP, 16.6 g DICY, 1.0 g Fenuron, 50.0 g TEPO 4.
Flexural modulus: 2737+/−319 MPa, K1C, 2.99+/−0.09 MPa.
TEPO 5:
66.0 g DER 732, 41.1 g DER 331, 41.7 g bisphenol A, 0.45 g TBAB. EEW: 2240.
Adhesive 5:
125.0 g DER 331, 7.4 g Cardolite 2513 HP, 16.6 g DICY, 1.0 g Fenuron, 5.0 g TEPO 5.
Flexural modulus: 2652+/−332 MPa, K1C, 2.82+/−0.11 MPa.
TEPO 6:
63.0 g DER 732, 39.3 g DER 331, 2.6 g bisphenol A, 0.43 g TBAB. EEW: 2952.
Adhesive 6:
125.0 g DER 331, 7.4 g Cardolite 2513 HP, 16.6 g DICY, 1.0 g Fenuron, 50.0 g TEPO 6.

Flexural modulus: 2260+/−386 MPa, K1C, 3.11+/−0.06 MPa.

TEPO 7:
114.0 g DER 732, 33.3 g bisphenol A, 0.44 g TBAB. EEW: 1613.

Adhesive 7:
125.0 g DER 331, 7.4 g Cardolite 2513 HP, 15.4 g DICY, 1.0 g Fenuron, 50.0 g TEPO 7.
Flexural modulus: 1790+/−23 MPa, K1C, 1.76+/−0.09 MPa.

TEPO 8:
114.0 g DER 732, 36.1 g bisphenol A, 0.45 g TBAB. EEW: 2277.

Adhesive 8:
125.0 g DER 331, 7.4 g Cardolite 2513 HP, 15.4 g DICY, 1.0 g Fenuron, 50.0 g TEPO 8.
Flexural modulus: 1714+/−28 MPa, K1C, 1.47+/−0.09 MPa.

TEPO 9:
108.8 g DER 732, 21.3 g DER 331, 36.8 g bisphenol A, 0.5 g TBAB. EEW: 1236.

Adhesive 9:
125.0 g DER 331, 7.4 g Cardolite 2513 HP, 15.8 g DICY, 1.0 g Fenuron, 50.0 g TEPO 9.
Flexural modulus: 2629+/−96 MPa, K1C, 2.51+/−0.15 MPa.

TEPO 10:
102.4 g DER 732, 19.8 g DER 331, 37.2 g bisphenol A, 0.48 g TBAB. EEW: 1416.

Adhesive 10:
125.0 g DER 331, 7.4 g Cardolite 2513 HP, 15.6 g DICY, 1.0 g Fenuron, 50.0 g TEPO 10.
Flexural modulus: 2375+/−38 MPa, K1C, 2.57+/−0.16 MPa.

TEPO 11:
96.0 g DER 732, 18.7 g DER 331, 37.8 g bisphenol A, 0.46 g TBAB. EEW: 1749.

Adhesive 11:
125.0 g DER 331, 7.4 g Cardolite 2513 HP, 15.5 g DICY, 1.0 g Fenuron, 50.0 g TEPO 11.
Flexural modulus: 1889+/−56 MPa, K1C, 2.05+/−0.21 MPa.

TEPO 12:
96.0 g DER 732, 28.0 g DER 331, 37.0 g bisphenol A, 0.46 g TBAB. EEW: 1201.

Adhesive 12:
125.0 g DER 331, 7.4 g Cardolite 2513 HP, 15.8 g DICY, 1.0 g Fenuron, 50.0 g TEPO 12.
Flexural modulus: 2340+/−75 MPa, K1C, 2.47+/−0.17 MPa.

TEPO 13:
89.6 g DER 732, 26.2 g DER 331, 37.2 g bisphenol A, 0.46 g TBAB. EEW: 1564.

Adhesive 13:
125.0 g DER 331, 7.4 g Cardolite 2513 HP, 15.6 g DICY, 1.0 g Fenuron, 50.0 g TEPO 13.
Flexural modulus: 2560+/−60 MPa, K1C, 2.42+/−0.24 MPa.

TEPO 14:
89.6 g DER 732, 26.2 g DER 331, 40.3 g bisphenol A, 0.47 g TBAB. EEW: 1818.

Adhesive 14:
125.0 g DER 331, 7.4 g Cardolite 2513 HP, 15.5 g DICY, 1.0 g Fenuron, 50.0 g TEPO 14.
Flexural modulus: 2328+/−62 MPa, K1C, 2.25+/−0.18 MPa.

TEPO 15:
48.0 g DER 732, 56.1 g DER 331, 41.0 g bisphenol A, 0.44 g TBAB. EEW: 1774.

Adhesive 15:
125.0 g DER 331, 7.4 g Cardolite 2513 HP, 15.5 g DICY, 1.0 g Fenuron, 50.0 g TEPO 15.
Flexural modulus: 3312+/−163 MPa, K1C, 2.73+/−0.57 MPa.

Adhesive 16:
48.0 g DER 331, 52.0 g Kane Ace MX-153, 5.9 g Cardolite 2513 HP, 10.6 g DICY, 0.8 g Fenuron, 40.0 g TEPO 4.
Flexural modulus: 2586+/−109 MPa, K1C, 2.69+/−0.18 MPa.

Adhesive 17:
65.0 g DER 331, 60.0 g Kane Ace MX-153, 7.4 g Cardolite 2513 HP, 13.4 g DICY, 1.0 g Fenuron, 50.0 g TEPO 15.
Flexural modulus: 2839+/−104 MPa, K1C, 2.84+/−0.21 MPa.

Adhesive 18:
55.0 g DER 331, 40.0 g Kane Ace MX-153, 7.4 g Cardolite 2513 HP, 11.0 g DICY, 1.0 g Fenuron, 80.0 g TEPO 4.
Flexural modulus: 2580+/−111 MPa, K1C, 2.88+/−0.13 MPa.

Adhesive 19:
125.0 g DER 331, 7.4 g Cardolite 2513 HP, 16.6 g DICY, 1.0 g Fenuron, 50.0 g TEPO 4.
Flexural modulus: 2737+/−319 MPa, K1C, 2.99+/−0.09 MPa.

Comparison Example 2

Prepo 2000

The polyether diamine and the epoxy resin are weighed out into a flat-ground flask and stirred for 3 h at 120° C.
40.0 g Jeffamine 2000, 60.0 g DER 331.

Comparison Example 3

59.5 g DER 331, 3.5 g Cardolite 2513 HP, 8.0 g DICY, 0.5 g Fenuron, 3.5 g Cabosil TS 720, 25.0 g Prepo 2000 (corresponds to a soft segment content of 10.0 g).
Flexural modulus: 2410+/−55 MPa, K1C, 2.07+/−0.05 MPa, Tg: 113+/−0.7° C., E-modulus: 2322+/−47 N/mm$^2$, elongation at fracture: 7.6+/−1.5%, tensile strength: 53.8+/−0.8 MPa.

Comparison Example 4

54.0 g DER 331, 3.5 g Cardolite 2513 HP, 8.5 g DICY, 0.5 g Fenuron, 3.5 g Cabosil TS 720, 30.0 g Kane Ace MX-153 (corresponds to a soft segment content of 10.0 g).
Flexural modulus: 2938+/−36 MPa, K1C, 2.71+/−0.05 MPa, Tg: 120+/−0.3° C., E-modulus: 3069+/−76 N/mm$^2$, elongation at fracture: 3.2+/−1.2%, tensile strength: 59.0+/−9.3 MPa.

Comparison Example 5

74.1 g DER 331, 3.5 g Cardolite 2513 HP, 8.4 g DICY, 0.5 g Fenuron, 3.5 g Cabosil TS 720, 10.0 g Adeka QR-9466 (corresponds to a soft segment content of 10.0 g).
Flexural modulus: 2910+/−116 MPa, K1C, 2.43+/−0.04 MPa, Tg: 117+/−0.0° C., E-modulus: 2953+/−74 N/mm$^2$, elongation at fracture: 4.2+/−1.5%, tensile strength: 62.1+/−4.9 MPa.

Adhesive 20:

63.2 g DER 331, 3.5 g Cardolite 2513 HP, 7.3 g DICY, 0.5 g Fenuron, 3.5 g Cabosil TS 720, 22.0 g TEPO 4 (corresponds to a soft segment content of 10.0 g).

Flexural modulus: 3287+/−54 MPa, K1C, 2.68+/−0.25 MPa, Tg: 109+/−1.4° C., E-modulus: 3263+/−98 N/mm$^2$, elongation at fracture: 13.0+/−1.4%, tensile strength: 64.3+/−0.6 MPa.

Comparison Example 6

45.2 g DER 331, 3.5 g Cardolite 2513 HP, 7.5 g DICY, 0.5 g Fenuron, 3.5 g Cabosil TS 720, 10.0 g Adeka QR-9466*, 30.0 g Kane Ace MX-153*

*Corresponds to a soft segment content of 20.0 g

Flexural modulus: 2255+/−38 MPa, K1C, 2.25+/−0.08 MPa, Tg: 114+/−0.7° C., E-modulus: 2218+/−42 N/mm$^2$, elongation at fracture: 10.4+/−0.8%, tensile strength: 49.1+/−0.5 MPa.

Comparison Example 7

30.5 g DER 331, 3.5 g Cardolite 2513 HP, 7.0 g DICY, 0.5 g Fenuron, 3.5 g Cabosil TS 720, 25.0 g Prepo 2000*, 30.0 g Kane Ace MX-153*

*Corresponds to a soft segment content of 20.0 g

Flexural modulus: 1919+/−33 MPa, K1C, 1.77+/−0.08 MPa, Tg: 117+/−0.4° C., E-modulus: 1805+/−44 N/mm$^2$.

Adhesive 21:

34.1 g DER 331 3.5 g Cardolite 2513 HP, 6.4 g DICY, 0.5 g Fenuron, 3.5 g Cabosil TS 720, 30.0 g Kane Ace MX-153*, 22.0 g TEPO 4*

*Corresponds to a soft segment content of 20.0 g

Flexural modulus: 2855+/−21 MPa, K1C, 2.95+/−0.18 MPa, Tg: 108+/−0.2° C., E-modulus: 2451+/−216 N/mm$^2$, Elongation at fracture: 13.4+/−2.9%, tensile strength: 51.2+/−0.8 MPa Comparison Example 8

Component A:
42.40 g DER 354, 4.99 g Cardolite Lite 2513 HP, 3.00 g Cabosil TS-720.
Component B:
44.16 g Capcure LOF, 5.46 g Versamine EH-30.
Hardening conditions: 60 minutes at 100° C., then three days at room temperature.
Tensile shear strength (DC05 CRS 1.5 mm): 10.84+/−1.47 MPa
Tensile shear strength (Alu 6016 1.25 mm): 10.32+/−1.96 MPa.
Adhesive 21:
Component A:
37.19 g DER 354, 5.00 g Cardolite Lite 2513 HP, 10.0 g TEPO 4, 3.02 g Cabosil TS-720.
Component B:
42.01 g Capcure LOF, 5.19 g Versamine EH-30.
Hardening conditions: 60 minutes at 100° C., then three days at room temperature.
Tensile shear strength (DC05 CRS 1.5 mm): 14.53+/−0.98 MPa
Tensile shear strength (Alu 6016 1.25 mm): 14.94+/−0.23 MPa.
Adhesive 22:
Component A:
29.38 g DER 354, 5.00 g Cardolite Lite 2513 HP, 25.0 g TEPO 4, 3.00 g Cabosil TS-720.

Component B:
37.74 g Capcure LOF, 4.66 g Versamine EH-30.
Hardening conditions: 60 minutes at 100° C., then three days at room temperature.
Tensile shear strength (DC05 CRS 1.5 mm): 18.93+/−0.27 MPa
Tensile shear strength (Alu 6016 1.25 mm): 16.51+/−0.40 MPa.

The invention claimed is:

1. A resin component for a one- or two-component adhesive or a structural foam, comprising
   C1) at least one epoxy resin, having an average of more than one epoxy group per molecule, that does not correspond to the definition of component C2);
   C2) at least one oligomeric or polymeric urethane-group-free polyether compound encompassing one or more structural elements of the general formula (I)

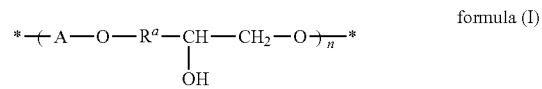

where n is a number from 5 to 10,000; each residue $R^a$ in each repeating unit denotes, mutually independently, a divalent connecting group that encompasses 1 to 100 carbon atoms; and each residue A in each repeating unit is selected, mutually independently, from K or L, K denoting a divalent residue of aromatic dihydroxy compounds after removal of the two hydroxyl groups, and L denoting a divalent residue of polyethers after the removal of two terminal hydroxyl groups, with the provision that, based on the total number of all residues A in the oligomeric urethane-group-free polyether compound, 20 to 80% of all residues A denote K, and 20 to 80% of all residues A denote L, and having terminal epoxy groups and having an epoxy equivalent weight of between 1000 and 3000 g/mol, with continuously connected polypropylene oxide blocks of 5 to 18 $C_3H_6O$ repeating units and aromatic blocks which contain at least one phenylene structural unit.

2. The resin component according to claim 1, wherein it does not comprise a benzoxazine compound.

3. The resin component according to claim 1, wherein it additionally comprises elastomer particles that have a core-shell structure.

4. The resin component according to claim 1, wherein it further comprises an impact modifier or toughener that is the reaction product of a carboxyl-group-containing copolymer based on butadiene-acrylonitrile with a stoichiometric excess of an epoxy resin in accordance with C1).

5. The resin component according to claim 1, wherein it further comprises an impact modifier or toughener that is the reaction product of an amino-group-containing polyether with a stoichiometric excess of an epoxy resin in accordance with C1).

6. A two-component adhesive whose first component is or comprises a resin component according to claim 1, and whose second component represents a hardener component that is or comprises at least one amino-group-containing compound or at least one thiol-group-containing compound.

7. An object that comprises at least two structural components that have been adhesively bonded with the two-component adhesive according to claim 6.

8. A thermally hardenable composition comprising a resin component according to claim 1 and C3) at least one latent hardener for component C1).

9. The thermally hardenable composition according to claim 8, wherein it additionally comprises C4) a physical or chemical blowing agent.

10. An object that comprises a foamed and cured composition according to claim 9.

11. An object that comprises at least two structural components that have been adhesively bonded with the thermally hardenable composition of claim 8.

12. A resin component for a one- or two-component adhesive or a structural foam, comprising
   C1) at least one epoxy resin, having an average of more than one epoxy group per molecule, that does not correspond to the definition of component C2);
   C2) at least one oligomeric or polymeric urethane-group-free polyether compound encompassing one or more structural elements of the general formula (I)

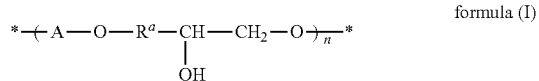

formula (I)

where n is a number from 5 to 10,000; each residue $R^a$ in each repeating unit denotes, mutually independently, a divalent connecting group that encompasses 1 to 100 carbon atoms; and each residue A in each repeating unit is selected, mutually independently, from K or L, K denoting a divalent residue of aromatic dihydroxy compounds after removal of the two hydroxyl groups, and L denoting a divalent residue of polyethers after the removal of two terminal hydroxyl groups, with the provision that, based on the total number of all residues A in the oligomeric urethane-group-free polyether compound, 20 to 80% of all residues A denote K, and 20 to 80% of all residues A denote L, and that is the reaction product of polypropylene oxide diglycidyl ether having an epoxy equivalent weight between 170 and 400 g/mol, bisphenol A, and a diglycidyl ether of bisphenol A or bisphenol F having an epoxy equivalent weight between 156 and 550 g/mol and an epoxy equivalent weight of the reaction product between 1000 and 3000 g/mol.

13. The resin component according to claim 12, wherein it further comprises an impact modifier or toughener that is the reaction product of a carboxyl-group-containing copolymer based on butadiene-acrylonitrile with a stoichiometric excess of an epoxy resin in accordance with C1).

14. The resin component according to claim 12, wherein it does not comprise a benzoxazine compound.

15. The resin component according to claim 12, wherein it additionally comprises elastomer particles that have a core-shell structure.

16. The resin component according to claim 12, wherein it further comprises an impact modifier or toughener that is the reaction product of an amino-group-containing polyether with a stoichiometric excess of an epoxy resin in accordance with C1).

17. A two-component adhesive whose first component is or comprises a resin component according to claim 12, and whose second component represents a hardener component that is or comprises at least one amino-group-containing compound or at least one thiol-group-containing compound.

18. An object that comprises at least two structural components that have been adhesively bonded with the two-component adhesive according to claim 17.

19. A thermally hardenable composition comprising a resin component according to claim 12 and
   C3) at least one latent hardener for component C1).

20. The thermally hardenable composition according to claim 19, wherein it additionally comprises C4) a physical or chemical blowing agent.

21. An object that comprises a foamed and cured composition according to claim 20.

22. An object that comprises at least two structural components that have been adhesively bonded with the thermally hardenable composition of claim 19.

* * * * *